United States Patent
Nakanishi (10) Patent No.: US 7,623,363 B2
(45) Date of Patent: Nov. 24, 2009

(54) RESONANT-TYPE SWITCHING POWER SUPPLY DEVICE

(75) Inventor: Ryouta Nakanishi, Niiza (JP)

(73) Assignee: Sanken Electric Co. Ltd., Saitama (JP)

( * ) Notice: Subject to any disclaimer, the term of this patent is extended or adjusted under 35 U.S.C. 154(b) by 0 days.

(21) Appl. No.: 12/143,679

(22) Filed: Jun. 20, 2008

(65) Prior Publication Data

US 2008/0316776 A1    Dec. 25, 2008

(30) Foreign Application Priority Data

Jun. 21, 2007  (JP) .............................. 2007-164405

(51) Int. Cl.
*H02M 7/00* (2006.01)
(52) U.S. Cl. .............................. 363/65; 363/69; 363/71
(58) Field of Classification Search .................. 363/65, 363/67, 69, 70, 71
See application file for complete search history.

(56) References Cited

U.S. PATENT DOCUMENTS 5,946,206 A * 8/1999 Shimizu et al. ............... 363/65
6,738,275 B1 * 5/2004 Beland ......................... 363/71
7,035,125 B2 * 4/2006 Yoshida ....................... 363/71
7,054,176 B2 * 5/2006 Moussaoui et al. .......... 363/71

FOREIGN PATENT DOCUMENTS

JP    10-229676    8/1998

* cited by examiner

*Primary Examiner*—Jessica Han
(74) *Attorney, Agent, or Firm*—Townsend and Townsend and Crew LLP

(57) ABSTRACT

There is provided a switching power supply device having one half-wave rectifying circuit made up of switching elements complementarily turned on or off, a reactor, a current resonance capacitor, a transformer, and a rectifying diode and another half-wave rectifying circuit made up of switching elements complementarily turned on or off, a reactor, a current resonance capacitor, a transformer, and a rectifying diode and configured so that the half-wave rectifying circuits commonly charges a smoothing capacitor. The switching elements are turned on or off according to a voltage of the smoothing capacitor and other switching elements are turned on or off based on a difference between a charging voltage of the current resonance capacitor and a charging voltage of the current resonance capacitor. As a result, power energy fed from the half-wave rectifying circuits connected in parallel is made equal.

9 Claims, 9 Drawing Sheets

FIG.8A OUTPUT FROM OSCILLATOR 73

FIG.8B OUTPUT FROM TERMINAL Q OF T-FF 74

FIG.8C OUTPUT FROM TERMINAL $\overline{Q}$ OF T-FF 74

FIG.8D OUTPUT FROM AND GATE 75

FIG.8E OUTPUT FROM AND GATE 76

FIG.8F CHARGING VOLTAGE OF CAPACITOR 84

FIG.8G CHARGING VOLTAGE OF CAPACITOR 88

FIG.8H OUTPUT FROM COMPARATOR 86

FIG.8I OUTPUT FROM COMPARATOR 90

FIG.8J OUTPUT FROM TERMINAL Q OF RS-FF 77

FIG.8K OUTPUT FROM TERMINAL Q OF RS-FF 78

FIG. 9

PRIOR ART

RESONANT-TYPE SWITCHING POWER SUPPLY DEVICE

CROSS-REFERENCE TO RELATED APPLICATION

This application claims priority from Japanese Patent Application No. JP2007-164405, filed Jun. 21, 2007, the entire disclosure of which is incorporated herein by reference for all purposes.

BACKGROUND OF THE INVENTION

1. Field of the Invention

The present invention relates to a resonant-type switching power supply device and more particularly to the resonant-type switching power supply device made up of switching power supply circuits connected in parallel.

2. Description of Related Art

Figure 9:
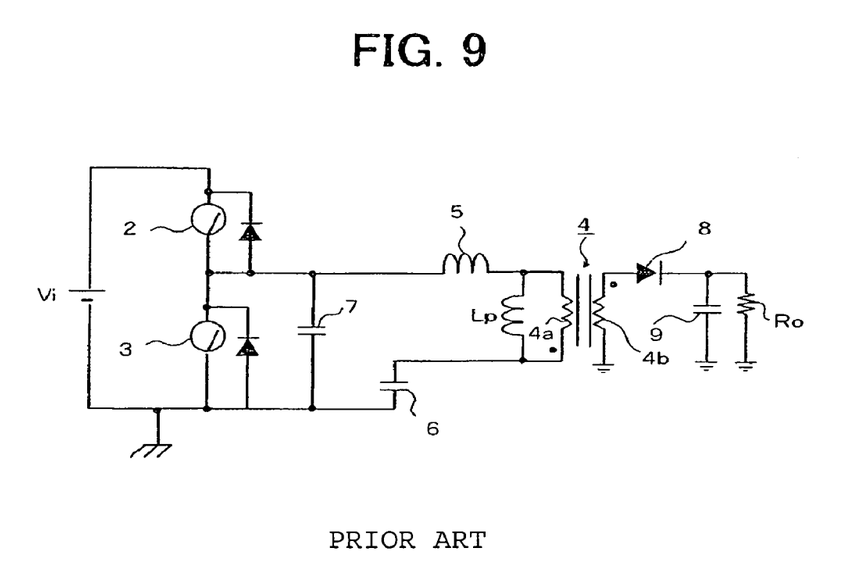
FIG. 9 is a diagram showing configurations of a conventional half-wave rectification resonant-type switching power supply device.

FIG. 9 shows one example of a conventional half-wave rectification resonant-type switching power supply device. The half-wave rectification resonant-type switching power supply device has switching elements 2 and 3 connected in series between a positive terminal and a negative terminal of a dc power source Vi and a transformer 4 connected between a connecting point of the switching elements 2 and 3 and the negative terminal of the dc power source Vi.

Moreover, between a connecting point of the switching elements 2 and 3 and a cold side terminal of a primary winding 4a of the transformer 4 is connected a reactor 5. Between a hot side terminal of the primary winding 4a of the transformer 4 and a negative terminal of the dc power source Vi is connected a current resonance capacitor 6. That is, a serial circuit made up of the reactor 5, primary winding 4a, and serially connected current resonance capacitor 6 is connected in parallel across the switching element 3. Across the switching element 3 is serially connected a voltage resonance capacitor 7.

To a hot side of the secondary winding 4b of the transformer 4 is connected an anode of a diode 8 constituting a rectifying circuit and a cathode of the diode 8 is connected to an anode of a smoothing capacitor 9. The above resonant-type switching power supply device is so configured that a direct output voltage is fed to a load, for example, a resistor Ro from an anode of the smoothing capacitor 9.

In the above resonant-type switching power supply device, the switching elements 2 and 3 are alternately on/off controlled. While the switching element 2 is on and the switching element 3 is turned off, resonance occurs among the reactor 5, exciting inductor Lp of the primary winding 4a, and current resonance capacitor 6. At this time point, a resonance current flows from the positive terminal of the direct current power source Vi to the reactor 5, primary winding 4a, current resonance capacitor 6. As a result, the current resonance capacitor 6 is charged. Also, when the switching element 2 is turned off and while the switching element 3 is turned on, a charging voltage of the current resonance capacitor 6 is applied to the primary winding 4a of the transformer 4, when a voltage across the primary winding 4a is inverted and, as a result, a diode 8 connected to the secondary winding 4a of the transformer 4 is turned on.

Therefore, resonance occurs in a circuit constituted of the reactor 5 and current resonance capacitor 6. The resonance current is reduced due to discharge of the current resonance capacitor 6. The resonance current then flows in a reverse direction and transfers power energy to the secondary winding 4b of the transformer 4. A current by the power energy transferred to the secondary winding 4b is rectified via the diode 8. The rectified current is fed to the smoothing capacitor 9 for charging. The smoothing capacitor 9 supplies direct current power to the resistor Ro. Moreover, the switching elements 2 and 3 are controlled so as not to be simultaneously turned on. That is, the switching elements 2 and 3 are alternately turned on or off with dead time. The voltage resonance capacitor 7 produces voltage resonance when the switching elements 2 and 3 are turned on or off.

Power energy transferred to the secondary side of the transformer 4 is determined depending on charge capacity of the current resonance capacitor 6. Therefore, by changing the period during which the switching element 2 is on, the power energy to be transferred to the secondary side of the transformer 4 can be changed. Also, the power energy to be transferred to the secondary side of the transformer 4 corresponds to a resonance current caused by the current resonance capacitor 6 and the reactor 5. The period during which the power energy is transferred to the secondary side is constant which does not depend on a length of the period during which the switching element 3 is on. The control of the switching element to control power energy to be transferred to the secondary side includes PWM (pulse-width modulation) control in which a switching frequency is made constant and the period during which the switching element 2 is on is made variable or frequency control in which the period during which the switching element 2 is on is made variable and the period during which the switching element 3 is on is made constant.

In general, the miniaturization of the switching power supply device is made possible by making high a frequency for off-operation. In the conventional half-wave rectification resonant-type switching power supply device as shown in FIG. 9, in order to make high a switching frequency of the switching elements 2 and 3, it is necessary to increase a resonance frequency which is determined by the reactor 5 and current resonance capacitor 6. Generally, to reduce component counts of a device, instead of the reactor 5, a leakage inductance of the transformer 4 may be used. It is difficult to finely adjust inductance of the reactor 5 and, therefore, resonance frequency is adjusted by changing capacity of the current resonance capacitor 6. However, if the capacitor of the current resonance capacitor 6 is made small, a current that can be flown through the current resonance capacitor 6 becomes smaller, which causes the difficulty in transferring of great power energy to the secondary side.

Conventionally, to solve this problem, in parallel-connection of the switching elements of the switching power supply device to take out great power energy as disclosed in Unexamined Japanese Patent Application Publication No. H10-229676 is envisioned.

However, the configurations in which a plurality of the conventional half-wave rectification resonant-type switching power supply devices shown in FIG. 9 are connected in parallel and the smoothing capacitor 9 is commonly used by the devices presents a problem in the power energy fed from the resonant-type switching power supply devices to the smoothing capacitor 9 can not be equal resultant in a low efficiency of the power supply device.

BRIEF SUMMARY OF THE INVENTION

In view of the above, an object of the present invention is to provide a power supply device capable of equalizing energy supplied from resonance-type switching power supply circuits connected in parallel to a smoothing capacitor.

Another object of the present invention is to provide a resonance-type switching power supply circuit whose efficiency is high. In order to achieve the above objects, according to a first aspect of the present invention, there is provided a resonant-type switching power supply device including:

a first half-wave rectifying circuit being provided with a first switching element and a second switching element both being connected in series to each other and both being connected to a direct current power source, with a first serial resonance circuit being connected to the first switching element or the second switching element and being constituted of a primary winding of a first transformer and a first resonance capacitor connected serially to the first winding, and with a first rectifying element connected to a secondary winding of the first transformer;

a second half-wave rectifying circuit being provided with a third switching element and a fourth switching element both being connected to the direct current power source and both being connected in series to each other, with a second serial resonance circuit being connected to the third switching element or the fourth switching element and being constituted of a primary winding of a second transformer and a second resonance capacitor connected to the primary winding, and with a second rectifying element connected to the secondary winding of the second transformer;

a smoothing capacitor being connected commonly to the first rectifying element and second rectifying element and being charged with power energy supplied by the first and second rectifying elements to output a direct current output voltage; and a voltage comparing unit to calculate a difference between a charging voltage of the first resonance capacitor and a charging voltage of the second resonance capacitor;

wherein the first switching element and the second switching element are alternately turned on or off according to the direct current output voltage and the third and fourth switching elements are alternately turned on or off according to the direct current output voltage and the difference calculated by the voltage comparing unit.

The control circuit may exert (perform) control so that a signal letting the third switching element and fourth switching element be alternately turned on or off is phase shifted from a signal letting the first switching element and second switching element be alternately turned on or off.

Moreover, the control circuit may be configured to exert control so that the signal letting the third switching element and fourth switching element be alternately turned on or off is phase shifted 180° from the signal letting the first switching element and second switching element be alternately turned on or off.

Also, the control circuit includes:
the voltage comparing unit;
an oscillator to generate a frequency signal having a frequency determined by on the direct current output voltage;
a pulse generating unit to generate a pulse having a first specified pulse width;
a frequency diving unit to divide the frequency signal to generate a first frequency-divided signal and a second frequency-divided signal both having a same frequency;
a first pulse generating unit to calculate a product of the first frequency-divided signal and a pulse generated by the pulse generating unit and to generate a first pulse string signal in which pulses each having the first specified pulse width appear in synchronization with the first frequency-divided signal;
a second pulse generating unit to calculate a product of the second frequency-divided signal and a pulse generated by the pulse generating unit to generate a second pulse string signal in which pulses each having the first specified pulse width appear in synchronization with the second frequency-divided signal;
a first driving signal generating unit to generate, from the first pulse string signal, a first driving signal in which a pulse having a second specified pulse is formed at a frequency corresponding to the direct current output voltage; and
a second driving signal generating unit to generate a second driving signal, from the second pulse string signal, a second driving signal in which a pulse whose pulse width changes from the second specified width at a frequency corresponding to the direct current output voltage and according to a difference between a charging voltage of the first resonance capacitor and a charging voltage of the second resonance capacitor is formed;
wherein the first switching element and the second switching element are alternately turned on or off by the first driving signal and the third switching element and the fourth switching element are alternately turned on or off by the second driving signal.

In this case, the frequency-dividing unit may be configured to divide the frequency signal and to generate a first frequency-divided signal and a second frequency-divided signal both having a same frequency and being phase shifted from each other and wherein the second driving signal generating unit may be configured to generate a pulse having a frequency corresponding to the direct current output voltage and being phase shifted from the first driving signal and whose pulse width changes according to a difference between a charging voltage of the first resonance capacitor and a charging voltage of the second resonance capacitor.

Also, the frequency-dividing unit may be configured to divide the frequency signal and to generate a first frequency-divided signal and a second frequency-divided signal both having a same frequency and both being phase shifted 180° from the second pulse string signal, a pulse having a frequency corresponding to the direct current output voltage and being phase shifted 180° from the first driving signal and whose pulse width changes according to a difference between a charging voltage of the first resonance capacitor and a charging voltage of the second resonance capacitor.

The control circuit may include:
the voltage comparing unit;
an oscillator to generate a frequency signal having a frequency determined by on the direct current output voltage;
a pulse generating unit to generate a pulse having a first specified pulse width;
a frequency diving unit to divide the frequency signal to generate a first frequency-divided signal and a second frequency-divided signal both having a same frequency;
a first pulse generating unit to calculate a product of the first frequency-divided signal and a pulse generated by the pulse generating unit and to generate a first pulse string signal in which pulses each having the first specified pulse width appear in synchronization with the first frequency-divided signal;
a second pulse generating unit to calculate a product of the second frequency-divided signal and a pulse generated by the pulse generating unit to generate a second pulse string signal in which pulses each having the first specified pulse width appear in synchronization with the second frequency-divided signal;
a first driving signal generating unit to generate, from the first pulse string signal, a first driving signal in which a pulse having a second specified pulse is formed at a frequency corresponding to the direct current output voltage; and a second driving signal generating unit to generate a second driving signal, from the second pulse string signal, a second driving signal in which a pulse whose pulse width changes from the second specified width at a frequency corresponding to the direct current output voltage and according to a difference between a charging voltage of the first resonance capacitor and a charging voltage of the second resonance capacitor is formed;

wherein the first switching element and the second switching element are alternately turned on or off by the first driving signal and the third switching element and the fourth switching element are alternately turned on or off by the second driving signal.

In this case, the frequency-dividing unit may be configured to divide the frequency signal and to generate the first frequency divided signal and the second frequency divided signal both having a same frequency and both being phase shifted from each other and wherein the second driving signal generating unit generates, from the second pulse signal, a pulse having a frequency corresponding to the direct current output voltage and being phase shifted from the first driving signal and whose pulse width changes according to a difference between a charging voltage of the first resonance capacitor and a charging voltage of the second resonance capacitor.

Also, the frequency-dividing unit may be configured to divide the frequency signal and to generate the first frequency divided signal and the second frequency divided signal both having a same frequency and both being phase shifted 180° from each other and wherein the second driving signal generating unit generates, from the second pulse signal, a pulse having a frequency corresponding to the direct current output voltage and being phase shifted 180° from the first driving signal and whose pulse width changes according to a difference between a charging voltage of the first resonance capacitor and a charging voltage of the second resonance capacitor.

DETAILED DESCRIPTION OF THE INVENTION

Figure 1:
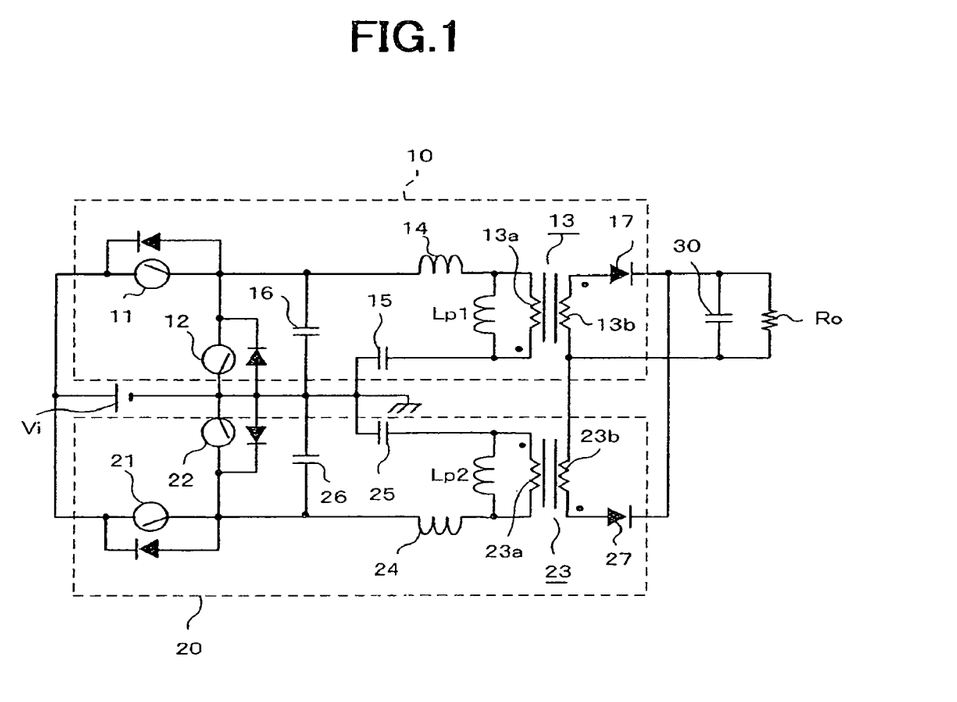
FIG. 1 is a diagram showing configurations of a resonance-type switching power supply device according to the first embodiment of the present invention.

FIG. 1 shows the resonance-type switching power supply device of the first embodiment of the present invention. The resonance-type switching power supply device includes the first half-wave rectifying circuit 10, second half-wave rectifying circuit 20, and a smoothing capacitor 30 commonly used by the first and second half-wave rectifying circuits 10 and 20. The half-wave rectifying circuit 10 has the first switching element 11 and the second switching element 12 connected in series between a positive terminal and a negative terminal of a dc power source Vi. Also, a transformer 13 is provided between a connecting point of the first and second switching elements 11 and 12 and a negative terminal of the dc power source Vi. Each of the first and second switching elements 11 and 12 is made up of, for example, a field-effect transistor.

Between a connecting point of the first and second switching elements 11 and 12 and a cold-side terminal of a primary winding 13a of the transformer 13 is connected a reactor 14. Between a hot-side terminal of the primary winding 13a of the transformer 13 and a negative terminal of the dc power source Vi is connected a current resonance capacitor 15. The reactor 14, primary winding 13a, and current resonance capacitor 15 make up the first serial resonance circuit. The first serial resonance circuit is connected between terminals of the switching element 12. Across the switching element 12 is further connected, in parallel, a voltage resonance capacitor 16. As the reactor 14, a leakage inductance of the transformer 13 may be used. To a hot-side terminal of the secondary winding 13b of the transformer 13 is connected an anode of the diode 17 serving as the first rectifying element.

The half-wave rectifying circuit 20 has the third switching element 21 and the fourth switching element 22 connected in series between a positive terminal and a negative terminal of the dc power source Vi. To the switching element 22 is connected the second transformer 23. Each of the switching elements 21 and 22 is made up of, for example, a field effect transistor.

Between a connecting point of the switching elements 21 and 22 and a cold-side terminal of the primary winding 23a of the transformer 23 is connected a reactor 24. Between a hot-side terminal of the primary winding 23a of the transformer 23 and a negative terminal of the dc power source Vi is connected a current resonance capacitor 25. The reactor 24, primary winding 23a, and a current resonance capacitor 25 make up the second serial resonance circuit. The second serial resonance circuit is connected, in parallel, across the switching element 22. Across the switching element 22 is further connected, in parallel, a voltage resonance capacitor 26. The reactor 24 may be a leakage inductance of the transformer 23. To a hot-side terminal of the secondary winding 23b of the transformer 23 is connected an anode of a diode 27 serving as the second rectifying element.

A cathode of a diode 17 of the half-wave rectifying circuit 10 and a cathode of the diode 27 of the half-wave rectifying circuit 20 are commonly connected to one electrode of the smoothing capacitor 30. The other electrode of the smoothing capacitor 30 is connected to a cold-side terminal of the secondary winding 13b of the transformer 13 and to a cold-side terminal of the secondary winding 23b of the transformer 23. To both terminal of the smoothing capacitor 30 is connected a load, for example, a resistor Ro.

Figure 2:
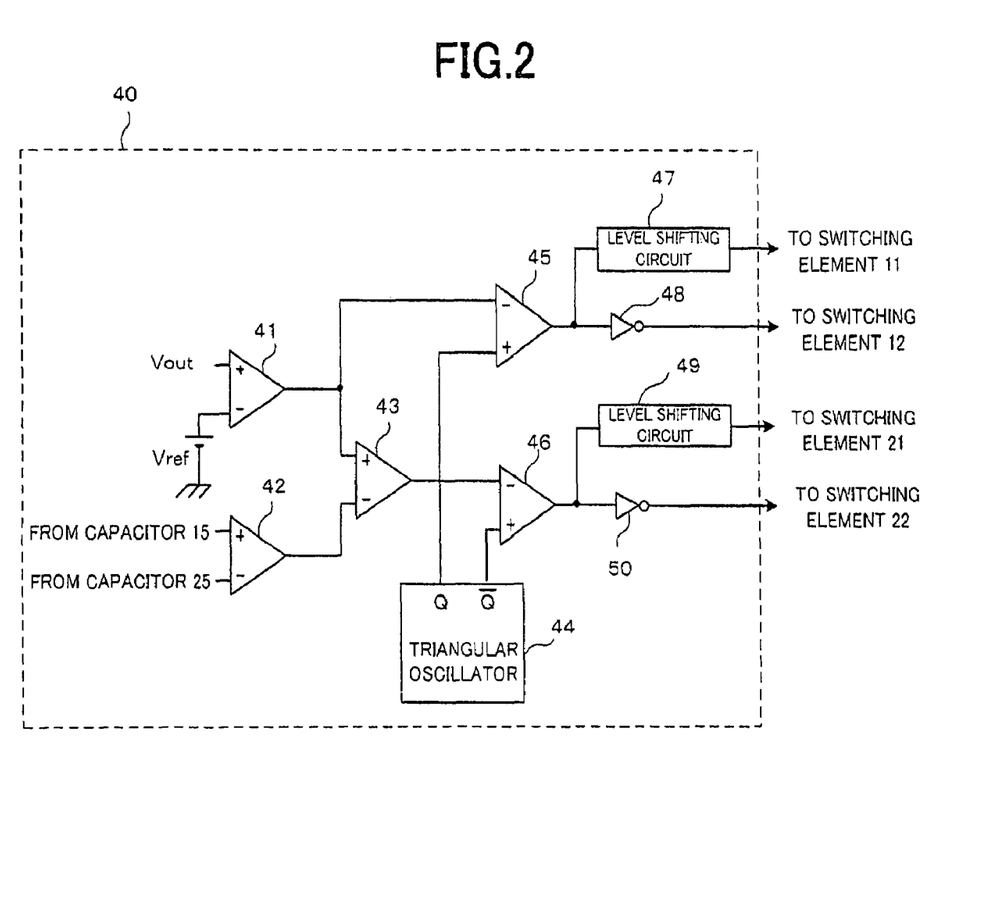
FIG. 2 is a diagram showing configurations of a control circuit of the resonance-type switching power supply device of FIG. 1.

FIG. 2 shows a control circuit to control operations of the half-wave rectification resonant-type switching power supply device of FIG. 1. The control circuit 40 includes difference amplifiers 41, 42, and 43, a triangular oscillator 44, comparators 45 and 46, level shifting circuits 47 and 49, and inverters 48 and 50.

To a non-inverted input terminal (+) of the difference amplifier 41 is inputted a charging voltage of the smoothing capacitor 30, that is, a direct current output voltage Vout to be supplied to the resistor Ro of the load. To an inverted input terminal (−) is inputted a reference voltage Vref. The difference amplifier 41 outputs a difference value between the direct current voltage Vout and the reference voltage Vref.

To a non-inverted input terminal (+) of the difference amplifier 42 is inputted a charging voltage of the current resonance capacitor 15. To an inverted input terminal (−) of the difference amplifier 42 is inputted a charging voltage of the current resonance capacitor 25. The difference amplifier 42 outputs a difference value between the charging voltage of the current resonance capacitor 15 and the charging voltage of the current resonance capacitor 25.

To an output terminal of the difference amplifier 41 is connected a non-inverted input terminal (+) of the difference amplifier 43. The output terminal of the difference amplifier 41 is also connected to an inverted input terminal (−) of the comparator 45. An output terminal of the difference amplifier 42 is connected to a non-inverted terminal (−) of the difference amplifier 43. The difference amplifier 43 synthesizes the difference values outputted from the difference amplifiers 41 and 42. An output terminal of the difference amplifier 43 is connected to an inverted input terminal (−) of the comparator 46. A non-inverted input terminal (+) of the comparator 45 is connected to an output terminal (Q) of the triangular oscillator 44. A non-inverted input terminal (+) of the comparator 46 is connected to an output terminal $\overline{Q}$ The triangular oscillator 44 outputs a triangular wave having a predetermined frequency from an output terminal (Q) and also outputs a triangular wave being opposite in phase to the triangular wave, that is, the triangular wave having a 180° phase shift from the output terminal $\overline{Q}$.

To an output terminal of the comparator 45 are connected the level shifting circuit 47 and the inverter 48. To an output terminal of the comparator 46 are connected the level shift circuit 49 and the inverter 50.

The level shifting circuit 47 generates a driving signal at a logical level corresponding to a level of an output signal from the comparator 45. The generated driving signal is supplied to an unillustrated gate of the switching element 11. The inverter 48 generates a driving signal at a logical level obtained by inverting the logical level of the driving signal generated by the level shifting circuit 47. The generated driving signal is fed to an unillustrated gate of the switching element 12. The level shifting circuit 49 generates a driving signal at a logical level corresponding to an output signal from the comparator 46. The generated driving signal is fed to an unillustrated gate of the switching element 21. The inverter 50 generates a driving signal at a logical level obtained by inverting the logical level of the driving signal generated by the level shifting 49. The generated driving signal is fed to an unillustrated gate of the switching element 22.

Figure 3A:
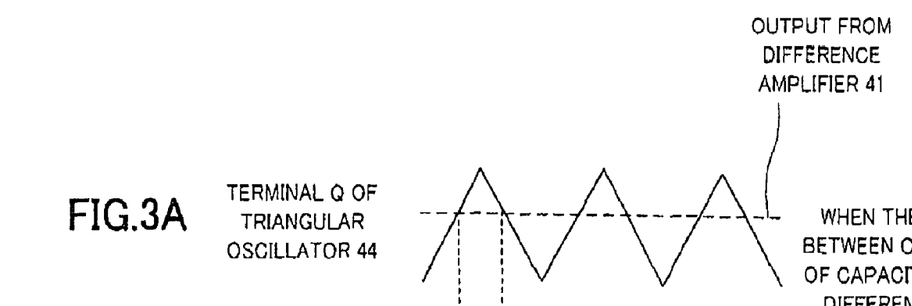
FIGS. 3A to 3D are waveform diagrams showing operations of the control circuit of FIG. 2.

The difference amplifier 41 calculates a difference between a direct current output voltage Vout and a reference voltage Vref and outputs the result from the calculation. If the direct current output voltage Vout becomes higher than the reference voltage Vref, a level of a signal outputted from the difference amplifier 41 becomes higher. The comparator 45 compares a triangular output signal, as shown in FIG. 3A, outputted from the output terminal (Q) of the triangular oscillator 44 with an output signal from the difference amplifier 41. As shown in FIG. 3C, the comparator 45 outputs a high level signal in the period during which a level of the triangular output signal is higher than that of the output signal from the difference amplifier 41 and outputs a low level signal in the period during which a level of the triangular output signal is lower than that of the output signal from the difference amplifier 41.

The level shifting circuit 47 and the inverter 48 output a driving signal which complementarily turns on or off the switching elements 11 and 12 according to an output from the comparator 45. The generated signal is fed to each of the switching elements 11 and 12. That is, when an output from the comparator 45 is at a high level, the level shifting circuit 47 supplies a high level signal to a gate of the switching element 11 and the inverter 48 supplies a low level signal to a gate of the switching element 12. When the output from the comparator 45 is at a low level, the level shifting circuit 47 supplied a low level signal to the gate of the switching element 11 and the inverter 48 supplies a high level signal to the gate of the switching element 12. These driving signals have dead time so as not to simultaneously turn on both the switching elements 11 and 12.

On the other hand, the difference amplifier 42 outputs a difference value between a charging voltage of the current resonance capacitor 15 and a charging voltage of the current resonance capacitor 25. The difference amplifier 43 synthesizes the difference value fed from the difference amplifier 41 and the difference value fed from the difference amplifier 42. When the charging voltage of the current resonance capacitor 25 is higher than that of the current resonance capacitor 15, a level of an output signal from the difference amplifier 42 becomes low. As a result, a level of an output signal of the difference amplifier 43 becomes high.

Figure 3B:
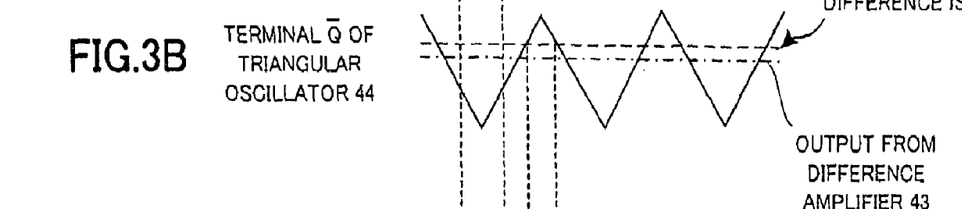
Figure 3C:
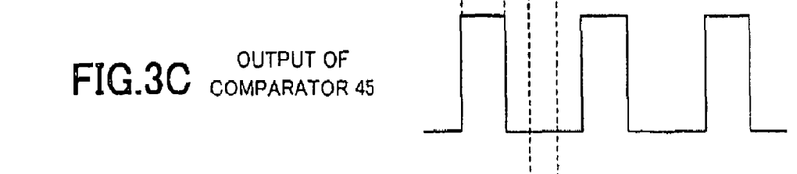
Figure 3D:
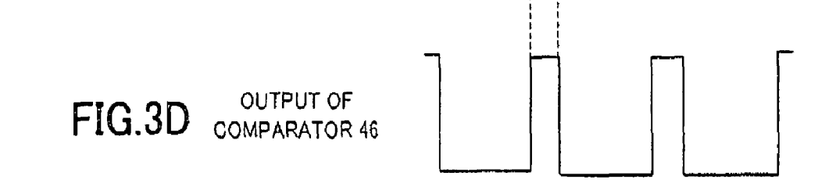

As shown in FIG. 3B, the comparator 46 compares a triangular output signal supplied from the output terminal $\overline{Q}$ with a level of the output signal from the triangular oscillator 44. As shown in FIG. 3D, the comparator 46 outputs a high level signal in the period during which a level of the triangular output signal is higher than that of the output signal from the difference amplifier 43 and outputs a low level signal in the period during which a level of the triangular output signal is lower than that of the output signal from the difference amplifier 43. The period during which the output signal from the comparator 46 is at a high level exists in the period during which the output signal from the comparator 45 is at a low level. The period during which the output signal from the comparator 45 is at a high level exists in the period during which the output signal from the comparator 46 is at a low level.

The level shifting circuit 49 and the inverter 50 output a driving signal which complementarily turns on or off the switching elements 21 and 22 according to an output from the comparator 46. The generated signal is fed to each of the switching elements 21 and 22. That is, when an output from the comparator 46 is at a high level, the level shifting circuit 49 supplies a high level signal to a gate of the switching element 21 and the inverter 50 supplies a low level signal to a gate of the switching element 22. When the output from the comparator 46 is at a low level, the level shifting circuit 49 supplied a low level signal to the gate of the switching element 21 and the inverter 50 supplies a high level signal to the gate of the switching element 22. Moreover, these driving signals have, so called, dead time so as not to simultaneously turn on both the switching elements 21 and 22.

By performing operations of the control circuit 40 described above, the switching elements 11 and 12 are alternately turned on or off. The switching elements 11 and 21 are alternately turned on or off in a phase shift of 180°. The switching elements 21 and 22 are also turned on or off in a phase shift of 180°.

In the half-wave rectifying circuit 10, in the period during which the switching element 11 is on and the switching element 12 is off, resonance occurs in the reactor 14, exciting inductance Lp1 of the primary winding 13a, and current resonance capacitor 15, all being connected in series. As a result, a resonant current flows from the positive terminal of the direct current power source Vi to the reactor 14, primary winding 13a, and current resonance capacitor 15 so that the current resonance capacitor 15 is charged.

Figures 4A, 4B:
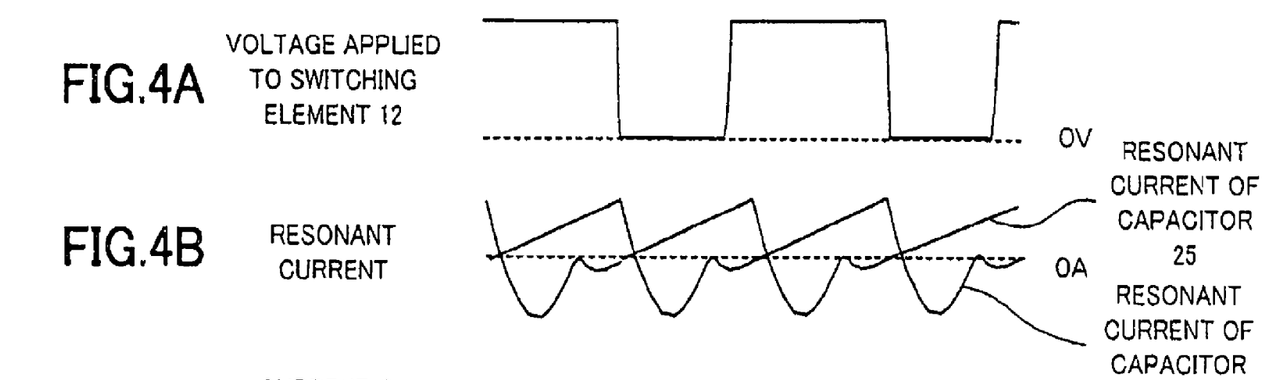
FIGS. 4A to 4C are waveform diagrams explaining operations of a half-wave rectification resonant-type switching power supply device.

Also, when the switching element 12 is on and the switching element 11 is off, as shown in FIG. 4A, a voltage across the switching element 11 drops to 0V. In the state in which the switching element 11 is turned off and the switching element 12 is turned on, a charging voltage of the current resonance capacitor 15 is applied to the primary winding 13a of the transformer 13. That is, the voltage across the primary winding 13a is inverted and, as a result, a diode 17 connected to the secondary winding 13b of the transformer 13 is turned on.

Therefore, resonance occurs in the reactor 14 and current resonance capacitor 15, thus causing flowing of a resonant current. The resonant current is decreased due to discharge of the current resonance capacitor 15 and then flows in a reverse direction, which transfers power energy to the secondary winding 13b side. The current having the power energy transferred to the secondary winding 13b is rectified via the diode 17 and is used for charging of the smoothing capacitor 30.

In the half-wave rectifying circuit 20, a driving signal used to turn on or off the switching element 21 and 22 is phase shifted 180° from the driving signal used to turn on or off the switching elements 11 and 12. Therefore, in the half-wave rectifying circuit 20, while the switching element 11 is on and the switching element 12 is off, the switching element 21 is turned off and the switching element 22 is turned on.

When the switching element 21 is turned off and the switching element 22 is turned on, a voltage across the switching element 22 drops to 0V. In a state in which the switching element 21 is off and the switching element 22 is on, a charging voltage of the current resonance capacitor 25 charged up to that time is applied to the primary winding 23a of the transformer 23. As a result, the voltage across the primary winding 23a is inverted which causes the diode 27 connected to the secondary winding 23b of the transformer 23 to be turned on.

Also, when the switching element 21 is turned on and the switching element 22 is turned off, a voltage across the switching element 21 drops to 0V. In the period during which the switching element 21 is on and the switching element 22 is off, resonance occurs in the reactor 24, exciting inductance Lp2 of the primary winding 23a, and current resonance capacitor 25, all being connected in series. As a result, as shown in FIG. 4B, a resonant current flows from the positive terminal of the dc power source Vi to the reactor 24, primary winding 23a, and current resonance capacitor 25 so that the current resonance capacitor 25 is charged.

Here, if the direct current output voltage Vout becomes higher than the reference voltage Vref, a level of an output signal from the difference amplifier 41 becomes higher. As a result, the period during which the comparator 45 is outputting a high level signal become shorter. That is, the period during which the switching element 11 is on becomes short, the power energy to be transferred to the secondary side of the transformer 13 is decreased, causing a drop in the direct current output voltage Vout.

Similarly, when a level of an output signal from the difference amplifier 41 becomes high, the voltage at the non-inverted input terminal (+) of the difference amplifier 43 becomes higher. As a result, a level of the output signal from the difference amplifier 43 becomes high and the period during which the comparator 46 is outputting a high level signal becomes shorter. That is, the period during which the switching element 21 is on becomes shorter.

Also, if a charging voltage of the current resonance capacitor 25 is higher than that of the current resonance capacitor 15, a level of the output signal from the difference amplifier 42 becomes low. As a result, a level of the output signal from the difference amplifier 43 becomes high. Due to this, the period during which the comparator 46 is outputting a high level signal becomes short, thus causing the period during which the switching element 21 is in an on state to be shortened. As a result, the charging voltage of the current resonance capacitor 25 drops. Thus, control is exercised so that a charging voltage of the current resonant capacitor 15 is made equal to a charging voltage of the current resonance capacitor 25.

Figure 4C:
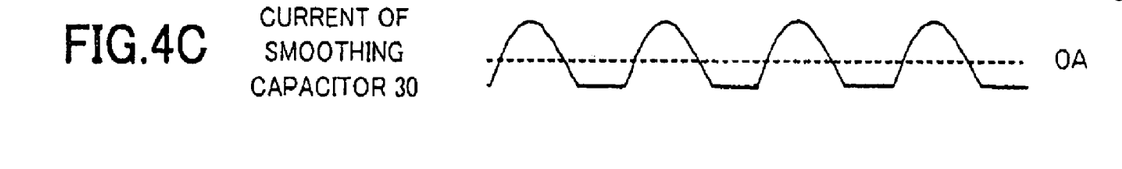

As shown in FIG. 4C, by repeating the above operations, a charging voltage of the smoothing capacitor 30 is stabilized and power is supplied to the resistor Ro being a load.

As described above, though the resonant-type switching power supply of the embodiment of the present invention is of a half-wave rectification type, even in the period during which energy is not transferred to the smoothing capacitor 30 from one transformer 13 and one transformer 23, the energy is transferred to the smoothing capacitor 30 from another transformer 23 and another transformer 13 and, therefore, a ripple of a current made to flow through the smoothing capacitor 30 can be suppressed. The current made to flow through the smoothing capacitor 30 from the transformer 13 is phase shifted 180° from the current made to flow from the transformer 23, thereby decreasing an effective value of the current made to flow through the smoothing capacitor 30. Also, the energy to be transferred to the secondary side by the transformers 13 and 23 is determined depending on a charging amount of the current resonance capacitors 15 and 25 and, therefore, the charging voltage of the current resonance capacitor 15 is made equal to the charging voltage of the current resonant capacitor 25, which causes the power energy outputted from the resonant-type half-wave rectifying circuit 10 to become equal to the power energy outputted from the resonant-type half-wave rectifying circuit 20.

Figure 5:
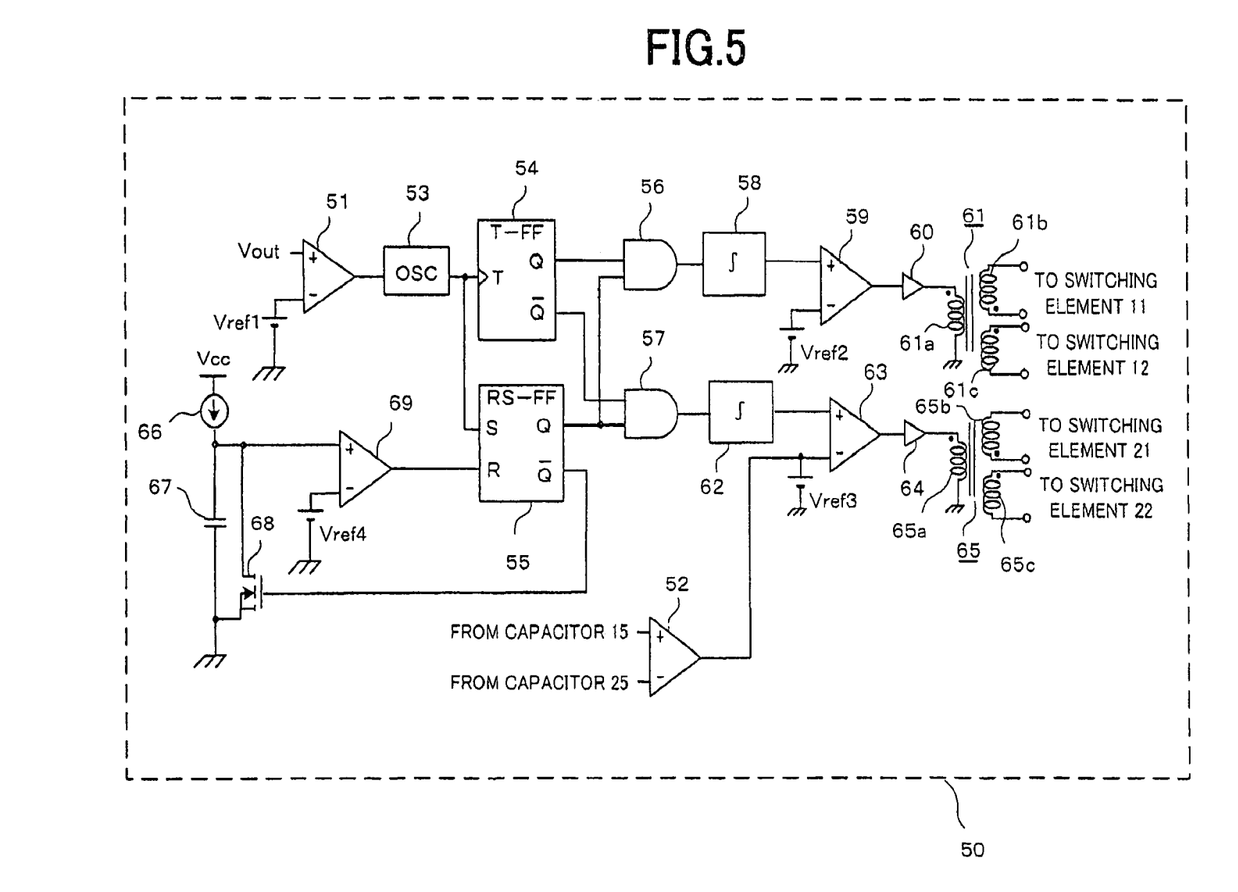
FIG. 5 is a diagram showing configurations of a control circuit according to the second embodiment of the present invention.

FIG. 5 shows a control circuit 50 of the second embodiment of the present invention. The control circuit 50 of the second embodiment is installed on the half-wave resonant-type switching power supply shown in FIG. 1 instead of the control circuit 40 shown in FIG. 2.

The control circuit 50 includes a difference amplifier 51 and a difference amplifier 52. To a non-inverted input terminal (+) of the difference amplifier 51 is inputted a direct current output voltage Vout of the smoothing capacitor 30 to be fed to the resistor Ro being a load. To an inverted input terminal (−) of the difference amplifier 51 is inputted a reference voltage Vref1. The difference amplifier 51 outputs a difference value between a direct current output voltage Vout and a reference voltage Vref1. To a non-inverted input terminal (+) of the difference amplifier 52 is inputted a charging voltage of the current resonance capacitor 15. To a non-inverted input terminal (−) of the difference amplifier 52 is inputted a charging voltage of the current resonance capacitor 25. The difference amplifier 52 is a voltage comparing means which compares a charging voltage of the current resonance capacitor 15 with a charging voltage of the current resonance capacitor 25 to output the difference value.

An output terminal of the difference amplifier 51 is connected to an oscillator (OSC) 53. The oscillator 53 generates a pulse having a frequency determined according to the difference value fed from the difference amplifier 51.

An output terminal of the oscillator 53 is connected to an input terminal T of a toggle flip-flop (hereinafter, T-FF) 54 and to a set terminal (S) of a reset-set flip-flop (hereinafter, RS-FF) 55. The T-FF 54 is a frequency dividing means. The T-FF 54 outputs alternately high-level and low-level signals from a non-inverted phase output terminal (Q), every time when a pulse is inputted from the input terminal T. The T-FF 54 also outputs a signal being opposite in phase to a non-inverted phase output signal from an inverted-phase output terminal ($\overline{Q}$).

The RS-FF 55 outputs a signal which becomes high when a high-level signal is inputted to the set terminal (S) and becomes low when a high-level signal is inputted to a reset terminal (R) from the non-inverted phase output terminal (Q). The RS-FF 55 outputs a signal being opposite in phase to the non-inverted phase output signal fed from the inverted-phase output terminal ($\overline{Q}$).

The non-inverted output terminal (Q) of the T-FF 54 is connected to one input terminal of an AND gate 56 being a means for generating the first pulse signal. The inverted-phase output terminal ($\overline{Q}$) of the T-FF 54 is connected to one input terminal of an AND gate 57 being a means for generating the second pulse signal.

The non-inverted phase terminal (Q) of the RS-FF 55 is connected to the other input terminal of the AND gate 56 and to the other input terminal of the AND gate 57.

An output terminal of the AND gate 56 is connected to an integrator 58. An output terminal of the integrator 58 is connected to a non-inverted terminal (+) of a comparator 59. To an inverted input terminal (−) of the comparator 59 is inputted a reference voltage Vref. An output terminal of the comparator 59 is connected, via a driver 60, to the primary winding 61a of the transformer 61. The secondary winding 61b and the secondary winding 61c are electromagnetically coupled to the primary winding 61a of the transformer 61. The secondary winding 61b is connected to a gate of the switching element 11 and the secondary winding 61c is connected to a gate of the switching element 12.

An output terminal of the AND gate 57 is connected to the integrator 62. An output terminal of the integrator 62 is connected to a non-inverted input terminal (+) of the comparator 63. To an inverted input terminal (−) of the comparator 63 are inputted an output signal of the difference amplifier 52 and the reference voltage Vref3. An output terminal of the comparator 63 is connected, via a driver 64, to the primary winding 65a of the transformer 65. The secondary winding 65b and the secondary winding 65c are electromagnetically coupled to the primary winding 65a of the transformer 65. The secondary winding 65b is connected to a gate of the switching element 21 and the secondary winding 65c is connected to a gate of the switching element 22.

The control circuit 50 is further provided with a constant current source 66 connected to a capacitor 67, a field effect transistor (hereinafter, FET) 68, and a comparator 69. These circuits, together with the RS-FF 55, make up a pulse generating means to generate a pulse of a predetermined width.

The capacitor 67 is connected between a constant current source 66 and a ground. To a connecting point between the capacitor 67 and the constant current source 66 are connected a drain of an FET 68 and a non-inverted input terminal (+) of the comparator 69. A source of the FET 68 is connected to a ground. To an inverted input terminal (−) of the comparator 69 is inputted the reference voltage Vref 4. A gate of the FET 68 is connected to an inverted-phase output ($\overline{Q}$) of the RS-FF 55.

Figure 6A:
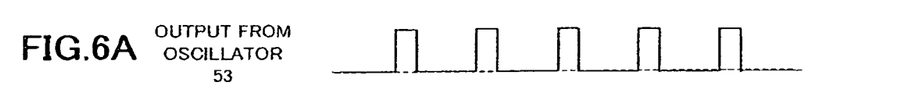
FIGS. 6A to 6L are waveform diagrams explaining operations of the control circuit of FIG. 5.

FIGS. 6A to 6L are waveform diagrams explaining operations of the control circuit 50. The difference amplifier 51 outputs a difference value between the direct current output voltage Vout being a charging voltage of the smoothing capacitor 30 and the reference voltage Vref. If the dc output voltage Vout becomes higher than the reference voltage Vref, a level of the signal to be outputted from the difference amplifier 51. As shown in FIG. 6A, the oscillator 53 outputs a pulse having a frequency corresponding to an output signal based on the difference value fed from the difference amplifier 51.

Figure 6B:
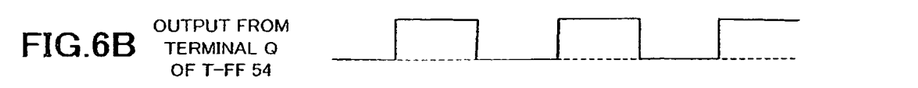
Figure 6C:
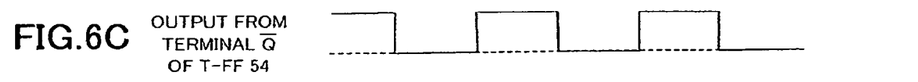
Figure 6D:
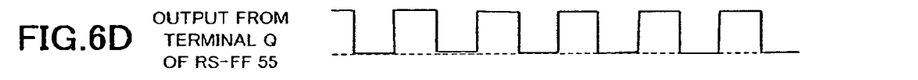

As shown in FIG. 6B, the T-FF 54 outputs an output signal whose level is switched between a high and a low every time when a pulse rises from the oscillator 53 from its non-inverted phase output terminal (Q). Moreover, the T-FF 54 outputs, as shown in FIG. 6C, a signal being opposite in phase to the above output signal from the inverted-phase output terminal ($\overline{Q}$). That is, the T-FF 54 divides a frequency outputted from the oscillator 43.

The RS-FF 55 is set every time when a pulse outputted from the oscillator 53 is inputted to a set terminal (S) and outputs a high level signal. Moreover, the RS-FF 55 is reset every time when a high level signal is inputted to a reset terminal (R) and outputs a low level signal from the inverted-phase output terminal (Q). Also, the RS-FF 55 outputs another signal being opposite in phase to the above output signal fed from the inverted-phase output terminal ($\overline{Q}$).

Figure 6E:
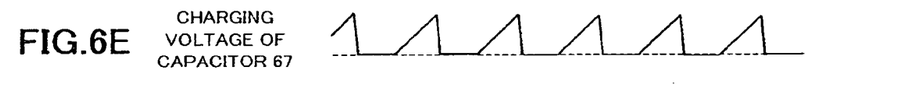
Figure 6F:
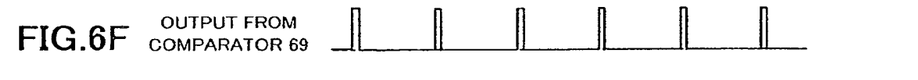

When a level of the output signal from the inverted-phase output terminal ($\overline{Q}$) becomes low, the FET 68 is turned off. When the FET 68 is turned off, the capacitor 67 is charged by the constant current source 66 and, as shown in FIG. 6E, a charging voltage of the capacitor 57 is boosted. If the charging voltage of the capacitor 67 is made equal to the reference voltage Vref 4, a level of the output signal from the comparator 69 is changed from a low to a high. The high signal outputted from the comparator 69 is inputted to a reset terminal (R) of the RS-FF 55. This causes the RS-FF 55 to be reset and a level of the signal outputted from the inverted-phase output terminal ($\overline{Q}$) of the RS-FF 55 becomes high. As a result, the FET 68 is turned on. The turning-on of the FET 68 causes the capacitor 67 to be charged and a level of the output signal from the comparator 69 is restored to a low.

That is, the signal outputted from the non-inverted phase output terminal (Q) of the R-FF 55 is maintained at a high level during the period between the time when a high-level signal is outputted from the oscillator 53 and the time when the charging voltage of the capacitor 67 becomes the reference voltage Vref 4. The period during which the signal is maintained at the high level is preferably set so as to be ½ of a period of the frequency of resonance between the current resonance capacitor 15 or 25 and the reactor 14 or 24 or so as to be slightly longer than that.

When the RS-FF 55 is reset, a level of the signal outputted from the non-inverted phase output terminal (Q) of the RS-FF 55 becomes low. The output signal is maintained at a low level until the oscillator 53 generates a pulse next. That is, during the period obtained by subtracting a specified period determined by charging time for the capacitor 67 from a frequency of the pulse of the oscillator 53 set based on the direct current output voltage Vout, the signal outputted from the non-inverted phase output terminal (Q) of the RS-FF 55 is maintained at a low level.

Figure 6G:
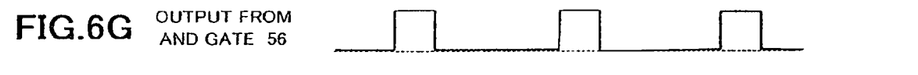
Figure 6H:
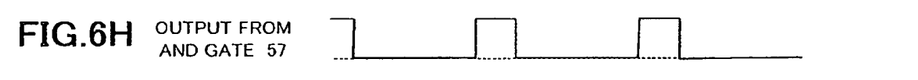

As shown in 6G, the AND gate 56 calculates a logical product of the signal outputted from the non-inverted phase output terminal (Q) and the signal outputted from the non-inverted output terminal (Q) of the RS-FF 55. As shown in FIG. 6H, the AND gate 57 calculates a logical product of the signal outputted from the non-inverted terminal (Q) of the RS-FF 55 and the signal outputted from the inverted-phase output terminal (Q) of the RS-FF 54.

Since, in the T-FF 54, a logical level of an output signal is inverted every time when a pulse is applied from the oscillator 53, a high-level output signal appears alternately in the AND gate 56 and AND gate 57.

A level of the signal outputted from the AND gate 56 becomes high during the period to be determined according to charging time for the capacitor 67 and becomes low during the period obtained by adding the period corresponding to one period of a pulse of the oscillator 53 to the period obtained by subtracting a high-level period from a period of the pulse generated by the oscillator 53.

Figure 6I:
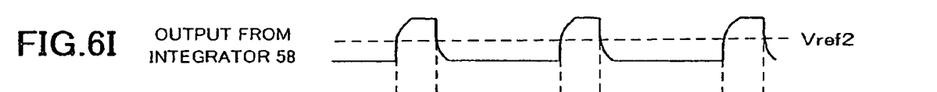
Figures 6J, 6K:
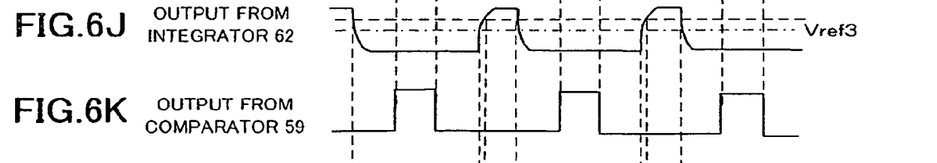

As shown in FIG. 6I, the signal outputted from the AND gate 56 is integrated by the integrator 58. The integrated signal is inputted to the comparator 59. The comparator 59 outputs a high-level signal in the period during which the output signal from the integrator 58 is higher than the reference voltage Vref 2. As shown in FIG. 6K, the driver 60 lets a current flow through the primary winding 61a of the transformer 61 in the period during which the high-level signal is being outputted. As a result, a driving signal appears in the winding 61c, which drives the gate of the switching element 12.

The comparator 59 outputs a low-level signal in the period during which a voltage of the output signal from the integrator 58 is lower than the reference voltage Vref 2. As shown in FIG. 6K, during the period described above, the driver 60 lets a current flow through the primary winding 61a of the transformer 61. As a result, a driving signal appears in the winding 61b and is applied to a gate of the switching element 11.

Figure 6L:
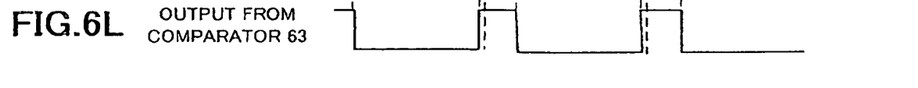

The output signal from the AND gate 57 is phase shifted 180° from the output signal from the AND gate 56. As shown in FIG. 6J, the output signal from the AND gate 57 is integrated by the integrator 62. The integrated signal is inputted to the comparator 63. The comparator 63 outputs a high-level signal in the period during which a voltage of the output signal from the integrator 62 is higher than the voltage obtained by adding a difference value fed from the difference amplifier 52 to the reference voltage Vref 3. As shown in FIG. 6L, during the above period, the driver 64 lets a current flow through the primary winding 65a of the transformer 65. As a result, a driving signal appears in the winding 65c, which drives the gate of the switching element 22.

The comparator 63 outputs a low-level signal in the period during which a voltage of the output signal from the integrator 62 is lower than the voltage obtained by adding a difference value fed from the difference amplifier 52 to the reference voltage Vref 3. As shown in FIG. 6L, during the above period, the driver 64 lets a current flow through the primary winding 65a of the transformer 65. As a result, a driving signal appears in the winding 65b, which drives the gate of the switching element 21.

Here, if a charging voltage of the current resonance capacitor 15 is higher than that of the current resonance capacitor 25, the output voltage from the difference amplifier 52 is boosted. This causes a pulse width outputted from the comparator 63 to become narrow and the period during which the switching element 22 is on to become short. Due to this, the charging time for the current resonance capacitor 25 is increased, which raises the charging voltage of the current resonance capacitor 25. Thus, the control circuit 50 exercises control so that a charging voltage of the current resonance capacitor 15 is made equal to that of the current resonance capacitor 25.

As described above, though the resonant-type switching power supply of the embodiment of the present invention is of a half-wave rectification type, even in the period during which energy is not transferred to the smoothing capacitor 30 from one transformer 13 and one transformer 23, the energy is transferred to the smoothing capacitor 30 from another transformer 23 and another transformer 13 and, therefore, a ripple of a current made to flow through the smoothing capacitor 30 can be suppressed. Also, the current made to flow through the smoothing capacitor 30 from the transformer 13 is phase shifted 180° from the current made to flow from the transformer 23, thereby decreasing an effective value of the current made to flow through the smoothing capacitor 30. Moreover, the energy to be transferred to the secondary side by the transformers 13 and 23 is determined depending on a charging amount of the current resonance capacitors 15 and 25 and, therefore, the charging voltage of the current resonance capacitor 15 is made equal to the charging voltage of the current resonant capacitor 25, which causes the power energy outputted from the resonant-type half-wave rectifying circuit 10 to become equal to the power energy outputted from the resonant-type half-wave rectifying circuit 20.

Figure 7:
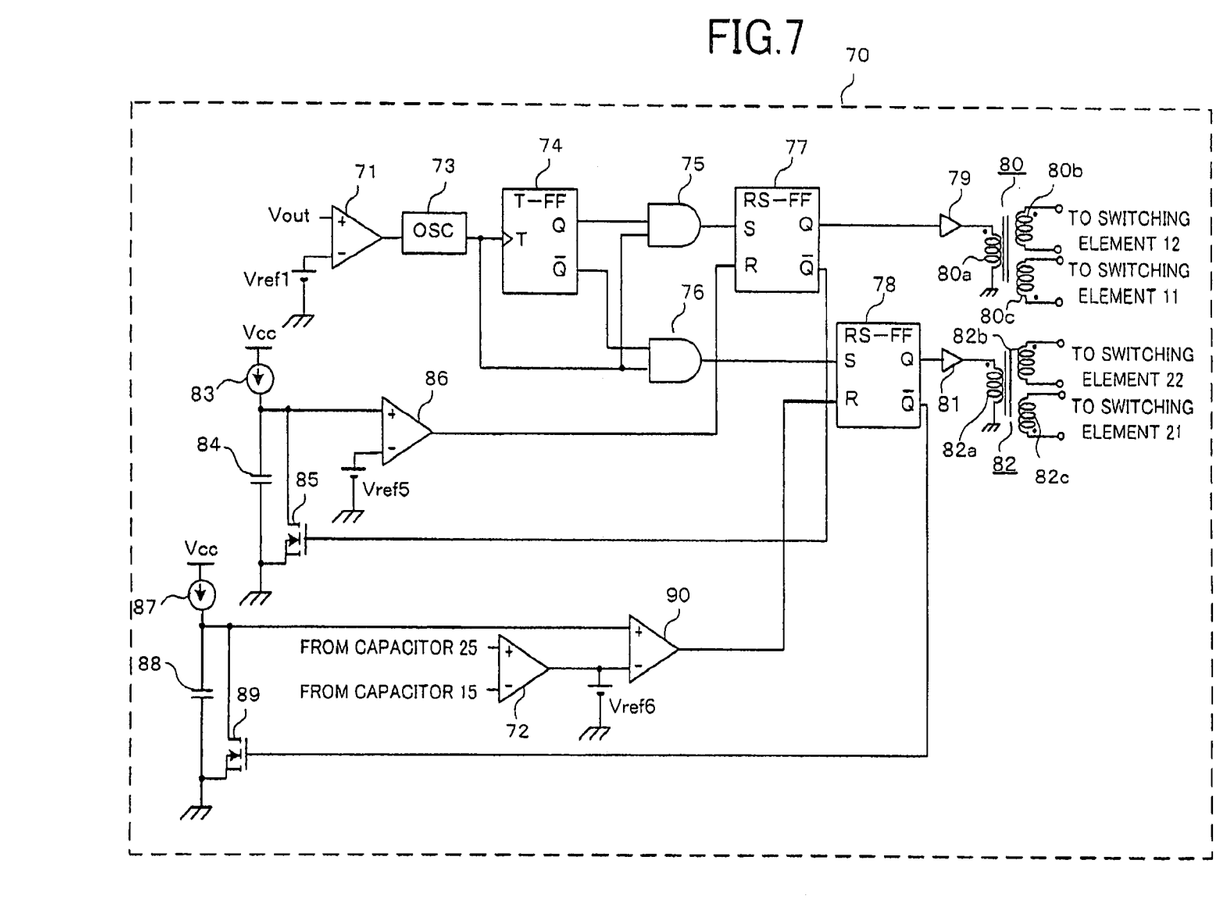
FIG. 7 is a diagram showing configurations of a control circuit according to the third embodiment of the present invention.

FIG. 7 shows configurations of a control circuit 70 of the third embodiment of the present invention. The control circuit 70 of the third embodiment is installed on the half-wave resonant-type switching power supply shown in FIG. 1, instead of the control circuit 40 shown in FIG. 2.

The control circuit 70 has a difference amplifier 71 and a difference amplifier 72. To a non-inverted input terminal (+) of the difference amplifier 71 is inputted a charging voltage Vout to be fed to the resistor Ro being a load and to an inverted input terminal (−) of the difference amplifier 71 is inputted a reference voltage Vref 1. The difference amplifier 71 outputs a difference value between the charging voltage Vout and the reference voltage Vref 1

To a non-inverted input terminal (+) of the difference amplifier 72 is inputted a charging voltage of the current resonance capacitor 25. To an inverted input terminal (−) of the difference amplifier 72 is inputted a charging voltage of the current resonance capacitor 15. The difference amplifier 72 is a voltage comparing means which compares a charging voltage of the current resonance capacitor 15 with that of the current resonance capacitor 25 to output the difference therebetween.

An output terminal of the difference amplifier 71 is connected to an oscillator (OSC) 73. The oscillator 73 generates a pulse having a frequency determined based on the difference value fed from the difference amplifier 71.

An output terminal of the oscillator 73 is connected to an input terminal T of a T-FF74 which serves as a frequency dividing means, to one input terminal of an AND gate 75 operating as the first pulse signal generating means, and to one input terminal of an AND gate 76 operating as the second pulse signal generating means. The T-FF74 outputs, from its non-inverted terminal (Q), signals which alternately and repeatedly become high or low every time when a pulse is inputted to an input terminal (T). Also, the T-FF74 outputs a signal being opposite in phase to the above output signal from its inverted phase output terminal ($\overline{Q}$). The non-inverted phase output terminal (Q) of the T-FF74 is connected to the other input terminal of the AND gate 75. The inverted phase output terminal ($\overline{Q}$) is connected to the other input terminal of the AND gate 76.

An output terminal of the AND gate 75 is connected to a set terminal (S) of an RS-FF77 operating as the first driving signal generating means. An output terminal of the AND gate 76 is connected to a set terminal (S) of an RS-FF78 operating as the second driving signal generating means.

A non-inverted phase output terminal (Q) of an RS-FF77 is connected to a driver 79. An output terminal of the driver 79 is connected to the primary winding 80a of the transformer

80. The winding 80b is connected to the gate of the switching element 12. The winding 80c is connected to the gate of the smoothing element 11.

A non-inverted phase output terminal (Q) of an RS-FF78 is connected to a driver 81. An output terminal of the driver 81 is connected to the primary winding 82a of the transformer 82. Windings 82b and 82c are electromagnetically coupled to the primary winding 82a. The winding 82b is connected to the gate of the switching element 22. The winding 82c is connected to the gate of the switching element 21.

The control circuit 70 is made up of a constant current source 83, a capacitor 84, an FET 85, and a comparator 86. The control circuit 70 has a means for setting the reset timing of the RS-FF77. As the means for setting the reset timing of the RS-FF78, a constant current source 87, a capacitor 88, an FET 89, and a comparator 90.

The constant current source 83 is connected to a direct current source Vcc. A capacitor 84 is connected between the constant current source 83 and ground. The connecting point of the constant current source 83 and the capacitor 84 is connected to a non-inverted phase input terminal (+). The connecting point of the constant current source 83 is also connected to a drain of the FET 80. A source of the FET 80 is connected to a ground.

To a non-inverted input terminal (−) of the comparator 86 is inputted a reference voltage Vref 5. An output terminal of the comparator 86 is connected to a reset terminal (R) of the RS-FF77. An inverted phase input terminal ($\overline{Q}$) of the RS-FF77 is connected to a gate of an FET 85.

The constant current source 87 is connected to the dc current source Vcc and a capacitor 88 is connected between the constant current source 87 and a ground. A connecting point of the constant current source 87 and the capacitor 88 is connected to a non-inverted input terminal (+) of a comparator 90. A connecting point of the constant current source 87 and the capacitor 88 is connected a drain of an FET 89. A source of the FET 89 is connected to a ground.

To a non-inverted phase input terminal (−) of the comparator 90 is inputted an output showing a difference value fed from the difference 72, together with a reference voltage Vref 6. An output terminal of the comparator 86 is connected to a reset terminal (R) of the RS-FF78. The inverted-phase output terminal ($\overline{Q}$) of the RS-FF78 is connected to a gate of the FET 89.

Figure 8A:
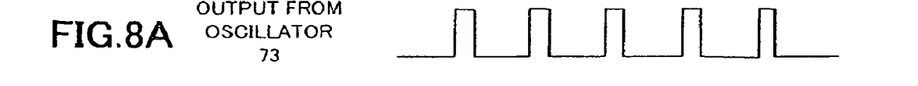
FIGS. 8A to 8K are waveform diagrams explaining operations of the control circuit of FIG. 7.
Figure 8B:
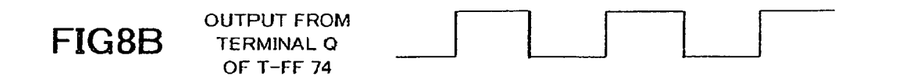
Figure 8C:
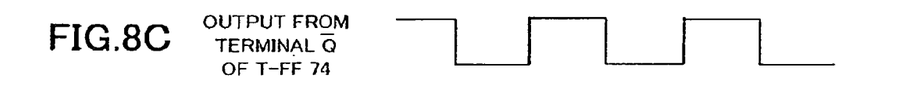

FIGS. 8A to 8K are waveform diagrams explaining operations of the control circuit 7. The difference amplifier 71 outputs a difference value between a direct current output voltage Vout and a reference voltage Vref 1. If the dc output voltage Vout becomes higher than the reference voltage, a level of a signal outputted from the difference amplifier 71 becomes high. As shown in FIG. 8A, the oscillator 73 outputs a pulse having a frequency based on a signal showing a difference value outputted from the difference amplifier 71. As shown in FIG. 8B, the T-FF 74 outputs, from the non-inverted phase output terminal (Q), an output signal whose level is switched between a high and a low every time when a pulse from the oscillator 73 is outputted. As shown in FIG. 8C, a signal being opposite in phase to the above output signal is outputted from its inverted-phase terminal ($\overline{Q}$).

Figure 8D:
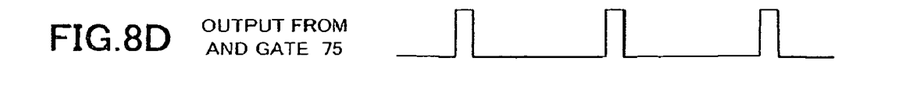
Figure 8E:
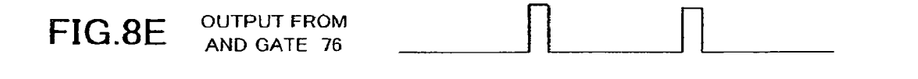

As shown in FIG. 8D, the AND gate 75 transmits the signal of a logical product of the signal to be outputted from the non-inverted phase output terminal (Q) of the T-FF 74 and the signal outputted from the oscillator 73 to the set terminal (S) of the RS-FF77. As shown in FIG. 8E, the AND gate 76 transmits the signal of a logical product of the signal to be outputted from the inverted phase output terminal ($\overline{Q}$) and the signal outputted from the oscillator 73 to the set terminal (S) of the RS-FF74 and the signal outputted from the oscillator 73 to the set terminal (S) of the RS-FF78. In the output signals of the AND gates 75 and 76, a period during which a high-level is outputted appears alternately. Therefore, the RS-FF77 and RS-FF78 are set alternately.

The RS-FF77 having been already set outputs a high-level signal from the non-inverted phase output terminal (Q). The high-level output signal causes the driver 79 to flow a current through the primary winding 80a of the transformer 80. As a result, the voltage generated in the winding 80b is applied to a gate of the switching element 12.

Figure 8F:
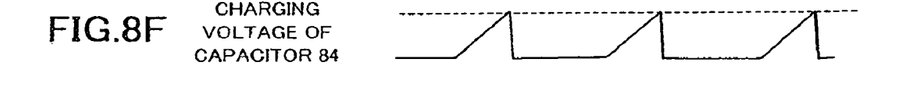

On the other hand, a level of the signal at the inverted-phase output terminal ($\overline{Q}$) becomes low. Due to this, the FET 85 is turned off and the capacitor 84 is charged by the constant current source 83. As a result, as shown in FIG. 8F, the charging voltage of the capacitor 84 is boosted. When the charging voltage of the capacitor 84 reaches the reference voltage Vref 5, the signal outputted from the comparator 86 is changed from its low level to its high level. As shown in FIG. 8J, the RS-FF77 is reset. Moreover, when the RS-FF77 is reset, a level of a signal outputted from the non-inverted phase output terminal (Q) of the RS-FF77 becomes low. As a result, a voltage generated in the winding 80c of the transformer 80 is applied to a gate of the switching element 11.

That is, for a specified period until the charging voltage of the capacitor 84 reaches the reference voltage Vref 5, the switching element 12 is on. Moreover, for a period of time obtained by subtracting the above specified period of time from the period being two times longer than a pulse generated from the oscillator, the switching element 11 is on.

The RS-FF78 operates in the same manner as the RS-FF77. That is, the RS-FF78 is reset when a level of a signal outputted from the AND gate 76 becomes high and drives the gate of the switching element 22 via the driver 1 and the winding 82b of the transformer 82. Also, when a charging voltage of the capacitor 88 reaches the reference voltage Vref 6, a level of the output from the comparator 90 becomes high and the RS-FF78 is reset. The gate of the switching element 21 is driven via the driver 81 and the winding 82c of the transformer 82.

Reset timing for the RS-FF 78 is set by the constant current source 87, capacitor 88, FET 89, and comparator 90. These constant current source 87, capacitor 88, FET 89, and comparator 90 operate in the same manner as the constant current source 83, capacitor 84, FET 85, and comparator 86 to set the reset timing for the RS-FF77.

However, unlike the comparator 86, to the inverted phase input terminal (−) of the comparator 90 are inputted an output from the difference amplifier 72, in addition to the reference voltage Vref 6. To a non-inverted input terminal (+) of the difference amplifier 72 is inputted the charging voltage of the current resonance capacitor 25. To an inverted input terminal (−) of the difference amplifier 72 is inputted a charging voltage of the current resonance capacitor 15. The difference amplifier 72 outputs a difference value between the charging voltage of the current resonance capacitor 15 and the charging voltage of the current resonance capacitor 25.

Therefore, if the reference voltage Vref 5 is made equal to the reference voltage Vref 6, the voltage at the non-inverted input terminal (−) of the comparator 90 changes by a difference value outputted from the difference amplifier 72. As a result, the timing with which a level of a signal outputted from the comparator 91 changes and, therefore, the timing with which the RS-FF 78 is reset changes.

Figure 8G:
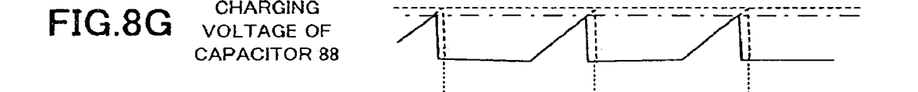
Figure 8H:
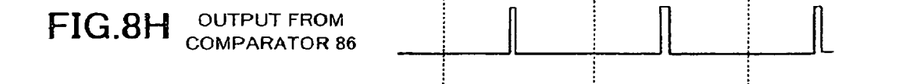
Figure 8I:
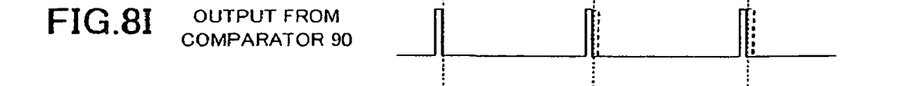
Figure 8J:
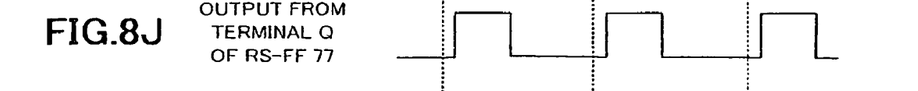
Figure 8K:
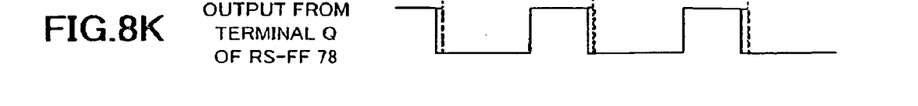

For example, if the charging voltage of the current resonance capacitor 25 is higher than that of the current resonance capacitor 15, the output voltage from the difference amplifier 72 is boosted and, as indicated by a dotted line in FIG. 8G, the voltage at the inverted input terminal (−) of the comparator 90 becomes higher. Therefore, the timing with which the output signal from the comparator 90 is changed to have a high level is delayed. As a result, the timing with which the RS-FF78 is reset is delayed. This causes the period during which the switching element 22 is on to be made long. The switching element 21 is on during the period obtained by subtracting the period during which the switching element 22 is on from the period being two times larger than a frequency of a pulse outputted from the oscillator 73 and, therefore, the period during which the switching element 21 is made short.

The period during which the switching element 22 is on represents the period during which power energy is transferred to the secondary side of the transformer 23. Even if the period during which the switching element 22 is on is made long, the power energy to be used for charging the smoothing capacitor 30 is not affected at all. On the contrary, if the period during which the switching element 21 is on is made short, the charging time for the current resonance capacitor 25 is decreased. As a result, the charging voltage of the current resonance capacitor 25 drops, which causes a decrease in an amount of the power energy to be supplied to the secondary side. Thus, the control circuit 70 exercises control so that the charging voltage of the current resonance capacitor 15 is made equal to that of the current resonance capacitor 25.

Though the resonant-type switching power supply of the embodiment of the present invention is of a half-wave rectification type, even in the period during which energy is not transferred to the smoothing capacitor 30 from one transformer 13 and one transformer 23, energy is transferred to the smoothing capacitor 30 from another transformer 23 and another transformer 13 and, therefore, a ripple of a current made to flow through the smoothing capacitor 30 can be suppressed. Also, the current made to flow through the smoothing capacitor 30 from the transformer 13 is phase shifted 180° from the current made to flow from the transformer 23, thereby decreasing an effective value of the current made to flow through the smoothing capacitor 30. Moreover, the energy to be transferred to the secondary side by the transformers 13 and 23 is determined depending on a charging amount of the current resonance capacitors 15 and 25 and, therefore, the charging voltage of the current resonance capacitor 15 is made equal to the charging voltage of the current resonant capacitor 25, which causes the power energy outputted from the resonant-type half-wave rectifying circuit 10 to become equal to the power energy outputted from the resonant-type half-wave rectifying circuit 20.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This patent application is based on Japanese Patent Application No. 2007-164405 filed on Jun. 21, 2007 and including specification, claims, drawings and summary. The disclosure of the above Japanese Patent Application is incorporated herein by reference in its entirety.

What is claimed is:

1. A resonant-type switching power supply device comprising:
   a first half-wave rectifying circuit being provided with a first switching element and a second switching element both being connected in series to each other and both being connected to a direct current power source, with a first serial resonance circuit being connected to the first switching element or the second switching element and being constituted of a primary winding of a first transformer and a first resonance capacitor connected serially to the first winding, and with a first rectifying element connected to a secondary winding of the first transformer;
   a second half-wave rectifying circuit being provided with a third switching element and a fourth switching element both being connected to the direct current power source and both being connected in series to each other, with a second serial resonance circuit being connected to the third switching element or the fourth switching element and being constituted of a primary winding of a second transformer and a second resonance capacitor connected to the primary winding, and with a second rectifying element connected to the secondary winding of the second transformer;
   a smoothing capacitor being connected commonly to the first rectifying element and second rectifying element and being charged with power energy supplied by the first and second rectifying elements to output a direct current output voltage; and
   a control circuit including a voltage comparing unit to calculate a difference between a charging voltage of the first resonance capacitor and a charging voltage of the second resonance capacitor;
   wherein the first switching element and the second switching element are alternately turned on or off according to the direct current output voltage and the third and fourth switching elements are alternately turned on or off according to the direct current output voltage and the difference calculated by the voltage comparing unit.

2. The resonant-type switching power supply device according to claim 1, wherein the control circuit exerts control so that a signal letting the third switching element and fourth switching element be alternately turned on or off is phase shifted from a signal letting the first switching element and second switching element be alternately turned on or off.

3. The resonant-type switching power supply device according to claim 2, wherein the control circuit exert control so that the signal letting the third switching element and fourth switching element be alternately turned on or off is phase shifted 180° from the signal letting the first switching element and second switching element be alternately turned on or off.

4. The resonant-type switching power supply device according to claim 1, wherein the control circuit comprises:
   the voltage comparing unit;
   an oscillator to generate a frequency signal having a frequency determined by on the direct current output voltage;
   a pulse generating unit to generate a pulse having a first specified pulse width;
   a frequency diving unit to divide the frequency signal to generate a first frequency-divided signal and a second frequency-divided signal both having a same frequency;
   a first pulse generating unit to calculate a product of the first frequency-divided signal and a pulse generated by the pulse generating unit and to generate a first pulse string signal in which pulses each having the first specified pulse width appear in synchronization with the first frequency-divided signal;
   a second pulse generating unit to calculate a product of the second frequency-divided signal and a pulse generated by the pulse generating unit to generate a second pulse string signal in which pulses each having the first specified pulse width appear in synchronization with the second frequency-divided signal;

a first driving signal generating unit to generate, from the first pulse string signal, a first driving signal in which a pulse having a second specified pulse is formed at a frequency corresponding to the direct current output voltage; and a second driving signal generating unit to generate a second driving signal, from the second pulse string signal, a second driving signal in which a pulse whose pulse width changes from the second specified width at a frequency corresponding to the direct current output voltage and according to a difference between a charging voltage of the first resonance capacitor and a charging voltage of the second resonance capacitor is formed;

wherein the first switching element and the second switching element are alternately turned on or off by the first driving signal and the third switching element and the fourth switching element are alternately turned on or off by the second driving signal.

5. The resonant-type switching power supply device according to claim 4, wherein the frequency-dividing unit divides the frequency signal and generates a first frequency-divided signal and a second frequency-divided signal both having a same frequency and being phase shifted from each other and wherein the second driving signal generating unit generates a pulse having a frequency corresponding to the direct current output voltage and being phase shifted from the first driving signal and whose pulse width changes according to a difference between a charging voltage of the first resonance capacitor and a charging voltage of the second resonance capacitor.

6. The resonant-type switching power supply device according to claim 4, wherein the frequency-dividing unit divides the frequency signal and generates a first frequency-divided signal and a second frequency-divided signal both having a same frequency and both being phase shifted 180°, from the second pulse string signal, a pulse having a frequency corresponding to the direct current output voltage and being phase shifted 180° from the first driving signal and whose pulse width changes according to a difference between a charging voltage of the first resonance capacitor and a charging voltage of the second resonance capacitor.

7. The resonant-type switching power supply device according to claim 1, wherein the control circuit comprises:

the voltage comparing unit;

an oscillator to generate a frequency signal having a frequency determined by the direct current output voltage;

a pulse generating unit to generate a pulse having a first specified pulse width;

a frequency diving unit to divide the frequency signal to generate a first frequency-divided signal and a second frequency-divided signal both having a same frequency;

a first pulse signal generating unit to calculate a product of the first frequency-divided signal and a pulse generated by the pulse generating unit and to generate a first pulse string signal in which pulses each having the first specified pulse width appear in synchronization with the first frequency-divided signal;

a second pulse signal generating unit to calculate a product of the second frequency-divided signal and a pulse generated by the pulse generating unit to generate a second pulse string signal in which pulses each having the first specified pulse width appear in synchronization with the second frequency-divided signal;

a first driving signal generating unit to generate, from the first pulse string signal, a first driving signal in which a pulse having a second specified pulse is formed at a frequency corresponding to the direct current output voltage; and a second driving signal generating unit to generate a second driving signal, from the second pulse string signal, a second driving signal in which a pulse whose pulse width changes from the second specified width at a frequency corresponding to the direct current output voltage and according to a difference between a charging voltage of the first resonance capacitor and a charging voltage of the second resonance capacitor is formed;

wherein the first switching element and the second switching element are alternately turned on or off by the first driving signal and the third switching element and the fourth switching element are alternately turned on or off by the second driving signal.

8. The resonant-type switching power supply device according to claim 7, wherein the frequency-dividing unit divides the frequency signal and generates the first frequency-divided signal and the second frequency-divided signal both having a same frequency and both being phase shifted from each other and wherein the second driving signal generating unit generates, from the second pulse signal, a pulse having a frequency corresponding to the direct current output voltage and being phase shifted from the first driving signal and whose pulse width changes according to a difference between a charging voltage of the first resonance capacitor and a charging voltage of the second resonance capacitor.

9. The resonant-type switching power supply device according to claim 7, wherein the frequency-dividing unit divides the frequency signal and generates the first frequency-divided signal and the second frequency-divided signal both having a same frequency and both being phase shifted 180° from each other and wherein the second driving signal generating unit generates, from the second pulse signal, a pulse having a frequency corresponding to the direct current output voltage and being phase shifted 180° from the first driving signal and whose pulse width changes according to a difference between a charging voltage of the first resonance capacitor and a charging voltage of the second resonance capacitor.

* * * * *